(12) United States Patent
Kagenishi

(10) Patent No.: US 7,000,384 B2
(45) Date of Patent: Feb. 21, 2006

(54) EXHAUST EMISSION CONTROL DEVICE OF ENGINE

(75) Inventor: Masao Kagenishi, Yokohama (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 243 days.

(21) Appl. No.: 10/704,907

(22) Filed: Nov. 12, 2003

(65) Prior Publication Data
US 2005/0115223 A1 Jun. 2, 2005

(30) Foreign Application Priority Data
Nov. 13, 2002 (JP) ............................. 2002-329634

(51) Int. Cl.
F01N 3/00 (2006.01)

(52) U.S. Cl. ............................. 60/295; 60/274; 60/297; 60/311

(58) Field of Classification Search .................. 60/274, 60/295, 297, 300, 311
See application file for complete search history.

(56) References Cited

U.S. PATENT DOCUMENTS 4,835,964 A * 6/1989 Kume et al. .................. 60/285
4,902,487 A * 2/1990 Cooper et al. ............ 423/215.5
5,711,149 A * 1/1998 Araki ........................... 60/278
6,304,815 B1 * 10/2001 Moraal et al. ............... 701/115
6,405,528 B1 * 6/2002 Christen et al. .............. 60/295
6,598,387 B1 * 7/2003 Carberry et al. .............. 60/297
6,708,486 B1 * 3/2004 Hirota et al. .................. 60/297
6,729,128 B1 * 5/2004 Shiratani et al. .............. 60/297
6,829,891 B1 * 12/2004 Kato et al. ..................... 60/297

FOREIGN PATENT DOCUMENTS

JP 5-34488 5/1993

* cited by examiner

Primary Examiner—Thomas Denion
Assistant Examiner—Diem Tran
(74) Attorney, Agent, or Firm—Birch, Stewart, Kolasch & Birch, LLP

(57) ABSTRACT

An exhaust emission control device comprises a temperature sensor for detecting the temperature of exhaust gas directly on the upper-stream side of a diesel particulate filter. An ECU adjusts a compulsive regeneration interval in accordance with a cumulative history of cases in which the exhaust gas temperature detected by means of the temperature sensor continues to be not lower than a value equivalent to a continuous regeneration temperature. The compulsive regeneration interval is adjusted by means of the ECU in accordance with a history of circumstances in which a state for continuous regeneration is realized.

6 Claims, 3 Drawing Sheets

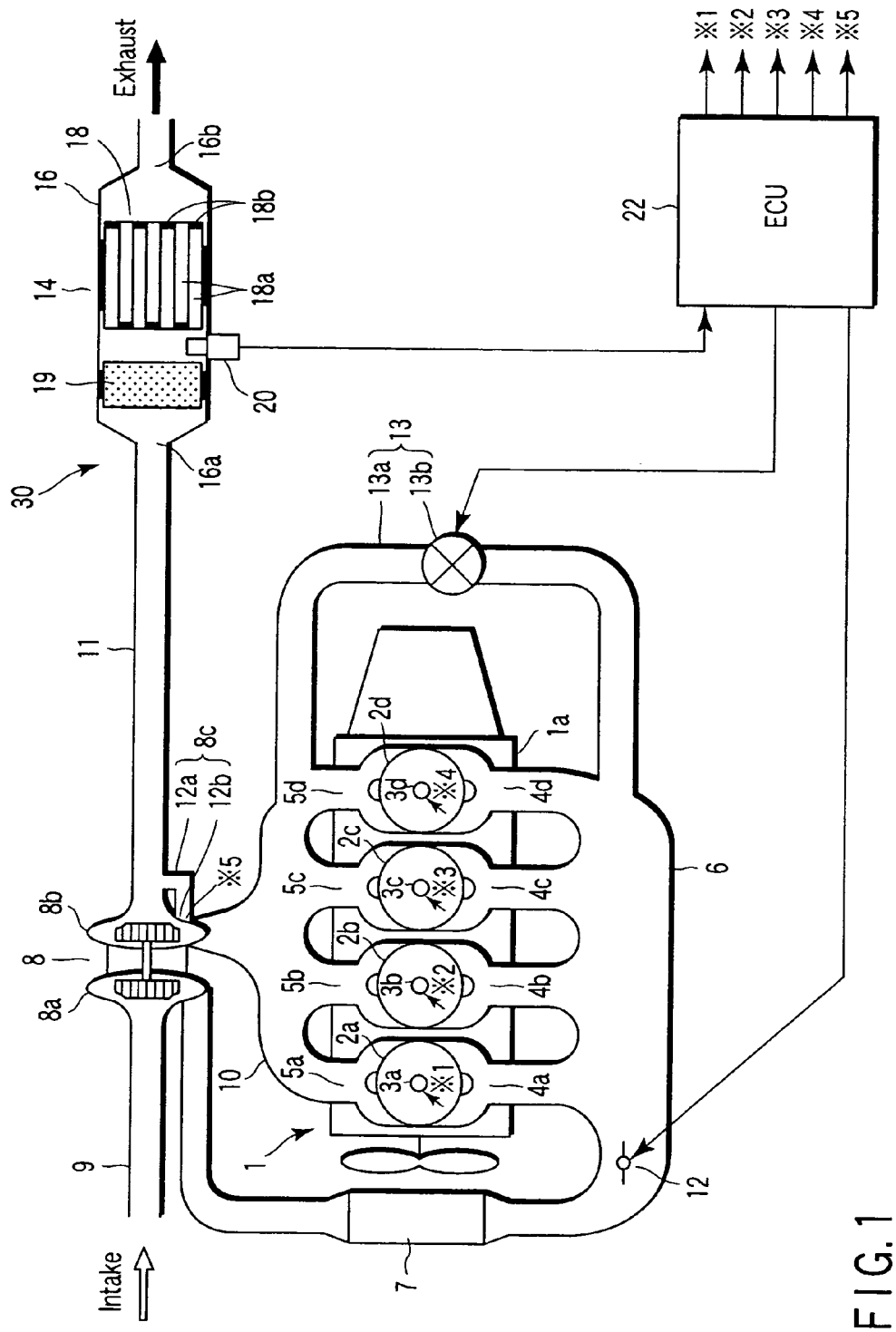
F I G. 1

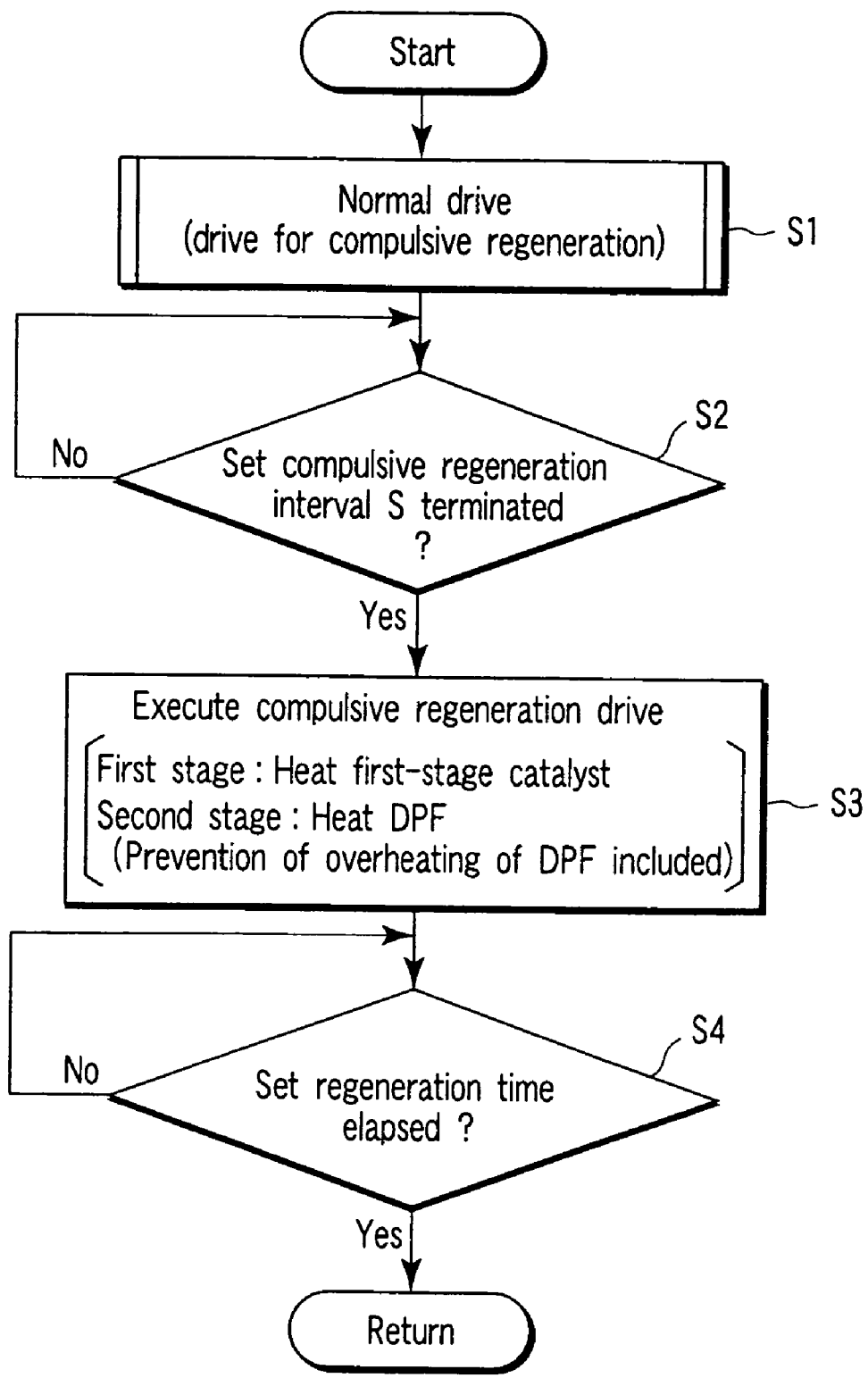
F I G. 2

EXHAUST EMISSION CONTROL DEVICE OF ENGINE

CROSS-REFERENCE TO RELATED APPLICATIONS

This application is based upon and claims the benefit of priority from the prior Japanese Patent Application No. 2002-329634, filed Nov. 13, 2002, the entire contents of which are incorporated herein by reference.

BACKGROUND OF THE INVENTION

1. Field of the Invention

The present invention relates to an exhaust emission control device of an engine and an exhaust emission control method, using a diesel particulate filter set in an exhaust passage of the engine and an oxidation catalyst located on the upper-stream side of the filter.

2. Description of the Related Art

A diesel particulate filter (hereinafter referred to as DPF) is used as an exhaust emission control device that is attached to a diesel engine, an example of an internal-combustion engine. The DPF is provided in the exhaust passage of the engine, and catches particulate matters (hereinafter referred to as PMs) in the exhaust gas of the engine.

The DPF must recover its capability to catch PMs. Therefore, the exhaust emission control device that is provided with the DPF uses a method such that the DPF is compulsively heated to a temperature at which the PMs are oxidized with every predetermined interval (e.g., ten hours). Thus, the PMs that are deposited on the DPF are burned with $O_2$ in a predetermined time. This method is called compulsive regeneration.

It is hard accurately to detect the quantity of PMs that are caught by the DPF while a vehicle is running. In the compulsive regeneration, therefore, the quantity of PMs caught by the DPF is estimated on the supposition that the PMs continue to be caught by the DPF until the interval terminates. The compulsive regeneration is carried out for the necessary time for the combustion of the estimated quantity of PMs.

While the vehicle is running normally, the exhaust gas sometimes may be heated to a temperature at which the PMs ignite spontaneously, depending on the driving conditions of the vehicle. Thus, in some driving conditions of the vehicle, the PMs that are deposited on the DPF may be spontaneously ignited and burned before the aforesaid interval terminates. This phenomenon will be referred to as self-burning herein-after. If the self-burning occurs, the actual quantity of caught PMs is much smaller than a predetermined estimated quantity of deposited PMs. In case of the self-burning, therefore, compulsive regeneration drive is liable to be carried out more frequently than it is needed.

As is described in Jpn. Pat. Appln. KOKOKU Publication No. 5-34488, for example, there is proposed a technique such that the exhaust gas temperature is detected and a counter for the compulsive regeneration interval is reset in accordance with the exhaust gas temperature. According to this prior art, the counter is reset when it is detected by the exhaust gas temperature that the DPF is brought to a regeneration state by the self-burning before a predetermined interval terminates. Thus, execution of undue compulsive regeneration drive can be prevented when the quantity of deposited PMs is small.

According to the prior art described above, however, the counter is inevitably reset at once if a temperature of, e.g., 600° C. or more at which the DPF is brought to the regeneration state by self-burning is detected. Thus, the counter value can be reset even if the DPF is not fully regenerated. If the counter is reset in this manner with the DPF not fully regenerated, the start of the next cycle of compulsive regeneration is retarded, so that the exhaust gas is rendered annoying. Since combustion at 600° C. or more advances hastily in the DPF, however, the incidence of this problem may be relatively low.

On the other hand, an exhaust emission control device of a continuous regeneration type has recently been developed. In this device, an oxidation catalyst is located ahead of the DPF, whereby PMs can be burned at a relatively low temperature. This device is designed so that NO in the exhaust gas is oxidized by means of the oxidation catalyst, and PMs that are caught by the DPF are burned continuously with the resulting $NO_2$ and $O_2$ in the exhaust gas. According to this exhaust emission control device, the PMs are burned at a temperature of 250° C. or more, which is lower than the temperature for the combustion (compulsive regeneration) with $O_2$ described in connection with the prior art example. The exhaust emission control device that regenerates the DPF at the low temperature in this manner is called a diesel particulate filter device of the continuous regeneration type.

In order to prevent undue compulsive regeneration drive, the aforementioned prior art method in which the interval counter is reset may possibly be applied also to the diesel particulate filter device of the continuous regeneration type. However, the PM combustion based on the continuous regeneration (combustion by reaction with $NO_2$) is advanced more slowly at a lower temperature (250° C. or more) than the combustion with $O_2$ (600° C. or more). If the aforesaid method in which the counter is reset is used, therefore, the compulsive regeneration is retarded too much for practical use.

BRIEF SUMMARY OF THE INVENTION

The object of the present invention is to provide an exhaust emission control device and an exhaust emission control method capable of continuous regeneration of a diesel particulate filter and of accurately setting an interval for compulsive regeneration.

An exhaust emission control device according to the invention comprises: a diesel particulate filter which is set in an exhaust passage of an engine and catches particulate matters in exhaust gas; an oxidation catalyst set in the exhaust passage so as to be situated on the upper-stream side of the diesel particulate filter; and compulsive regeneration control element which compulsively raises the temperature of the diesel particulate filter in a given interval, the device further comprising filter temperature related value detecting element which detects a parameter related to the temperature of the diesel particulate filter, the compulsive regeneration control element being configured to adjust the interval in accordance with an accumulation history of circumstances in which a value equivalent to a continuous regeneration temperature is exceeded by the parameter related to the temperature of the diesel particulate filter.

Thus, the interval for the start of continuous regeneration can be properly adjusted in accordance with the history of the circumstances in which a state for continuous regeneration is realized. Accordingly, the circumstances in which the continuous regeneration state is realized are reflected in the compulsive regeneration interval, so that unnecessary compulsive regeneration and retardation of the compulsive regeneration can be prevented. In consequence, the fuel-efficiency and exhaust gas performance can be improved.

Preferably, the compulsive regeneration control element adds up cases in which the parameter related to the temperature of the diesel particulate filter continues to be not lower than a given temperature for a given time, and the interval is lengthened with the increase of the resulting cumulative value. According to this configuration, the interval can be adjusted with the circumstances for the realization of the continuous regeneration state reflected in it, the fuel-efficiency and exhaust gas performance can be improved.

Preferably, the filter temperature related value detecting element detects the temperature of the exhaust gas directly on the upper-stream side of the diesel particulate filter, and the compulsive regeneration control element adjusts the interval in accordance with the exhaust gas temperature and executes the compulsive regeneration control in accordance with the exhaust gas temperature. According to this configuration, the exhaust gas temperature directly on the upper-stream side of the diesel particulate filter is used for the control for the adjustment of the compulsive regeneration interval and the compulsive regeneration control, so that both the control systems are simplified.

BRIEF DESCRIPTION OF THE SEVERAL VIEWS OF THE DRAWING

FIG. 1 is a diagram typically showing an exhaust emission control device of an engine according to an embodiment of the invention;

FIG. 2 is a flowchart showing control such that the exhaust emission control device shown in FIG. 1 is switched from normal drive over to compulsive regeneration in a compulsive regeneration interval;

DETAILED DESCRIPTION OF THE INVENTION

Figure 3A:
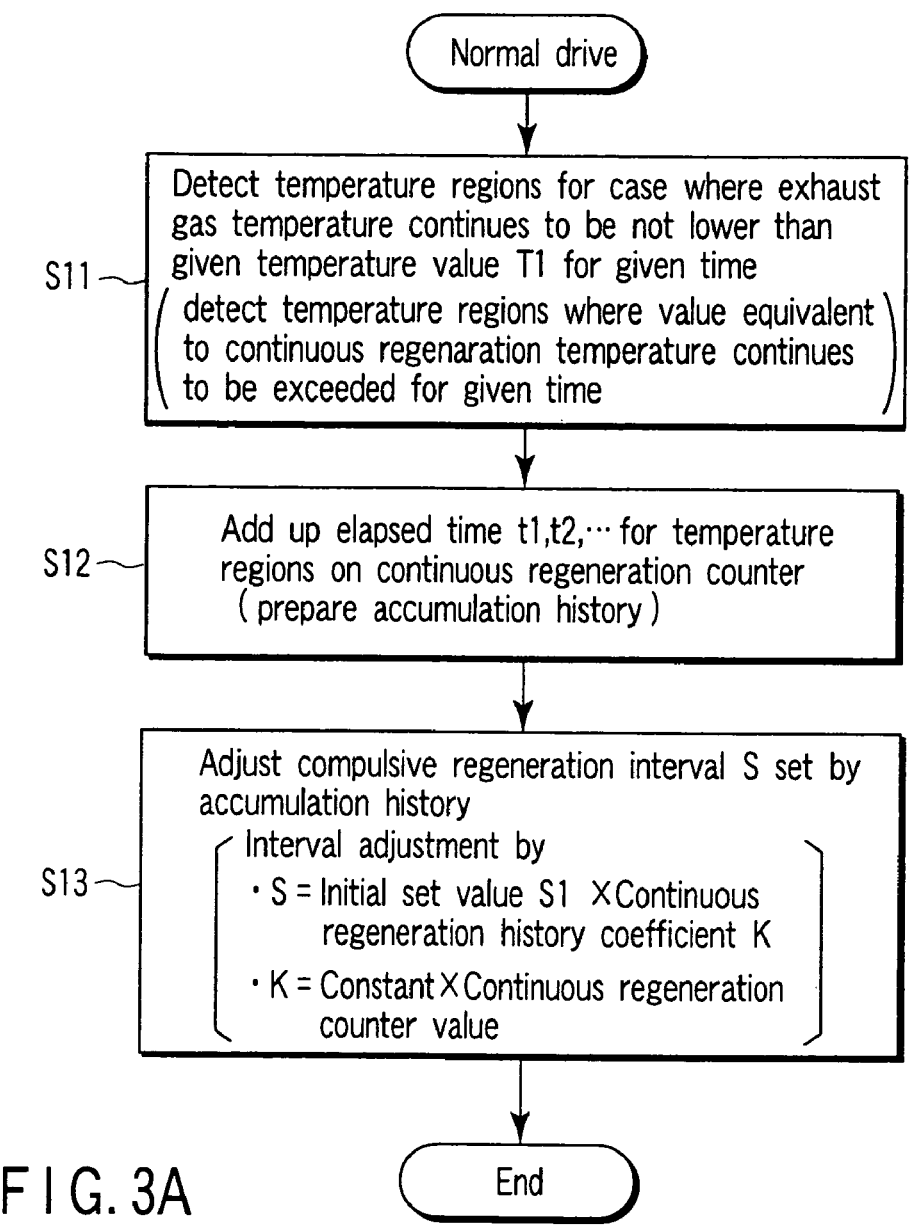
FIG. 3A is a flowchart showing control for adjusting the compulsive regeneration interval shown in FIG. 2.

An embodiment of the present invention will now be described with reference to FIGS. 1 to 3.

FIG. 1 shows a diesel engine 1 for run, as an example of an internal-combustion engine, which is mounted in a vehicle, such as a truck or bus. The diesel engine 1 is furnished with an exhaust emission control device 30. An engine body 1a of the diesel engine 1 is provided with four cylinders 2a to 2d that are arranged in series with one another, for example.

Each of the cylinders 2a to 2d holds a piston (not shown) for reciprocation. The respective top portions of cylinders 2a to 2d are provided with injectors 3a to 3d, intake ports 4a to 4d, exhaust ports 5a to 5d, and intake-exhaust valves (not shown), respectively.

Fuel suppliers (not shown) are connected to the injectors 3a to 3d, individually. Intake-exhaust operations of the intake-exhaust valves and injection operations of the injectors 3a to 3d are carried out at given points of time for the individual cylinders 2a to 2d. Thereupon, predetermined cycles, including intake, compression, detonation, and exhaust strokes, are executed individually in the cylinders 2a to 2d.

The intake ports 4a to 4d are formed on one side of the engine body 1a. An intake manifold 6 is connected to the intake ports 4a to 4d. A suction pipe 9 is connected to the intake manifold 6. The suction pipe 9 is fitted with an intercooler 7 of, e.g., an air-cooling type and a compressor portion 8a of a turbocharger 8. Air for combustion is introduced into the cylinders 2a to 2d through the suction pipe 9.

The exhaust ports 5a to 5d are formed on the other side of the engine body 1a. An exhaust manifold 10 is connected to the exhaust ports 5a to 5d. An exhaust pipe 11 is connected to the exhaust manifold 10. The exhaust pipe 11 is fitted with a turbine portion 8b of the turbocharger 8.

Exhaust gas having undergone combustion in the cylinders 2a to 2d is discharged to the outside of the cylinders through the exhaust pipe 11. The turbine portion 8b is provided with an exhaust relief portion 8c. An example of the exhaust relief portion 8c is composed of a bypass 12a and a waste gate valve 12b. The bypass 12a connects the inlet and outlet of the turbine portion 8b. The waste gate valve 12b has a function to open and close the bypass 12a.

An intake throttle valve 12 is set at the inlet of the intake manifold 6. An EGR device 13 is located between the intake manifold 6 and the exhaust manifold 10. The EGR device 13 is composed of an EGR passage 13a that connects the manifolds 6 and 10 and an EGR valve 13b that opens and closes the passage 13a.

A diesel particulate filter device 14 of a continuous regeneration type is attached to, for example, the rear part of the exhaust pipe 11 that constitutes the exhaust passage of the diesel engine 1. The filter device 14 has a cylindrical casing 16. Both end portions of the casing 16 are constricted. The central portion of the casing 16 has a diameter larger than that of the exhaust pipe 11.

An inlet port 16a is formed in one end portion of the casing 16. It is connected with an exhaust pipe portion that extends from the exhaust manifold 10. An outlet port 16b is formed in the other end portion of the casing 16. The outlet port 16b is open to the atmosphere.

The diesel particulate filter 18 (hereinafter referred to as DPF 18) is set in the casing 16. The DPF 18 includes filter portions 18a with a polygonal cross section, which are divided by porous bulkheads. The bulkheads are permeable to exhaust gas and impermeable to particulate matters. Adjacent inlets and outlets of a large number of through holes that are defined by the bulkheads of the filter portions 18a are alternately sealed by means of stoppers 18b. When the exhaust gas passes through the bulkheads of the DPF 18 in its thickness direction, in this configuration, the bulkheads catch particulate matters (hereinafter referred to as PMs) in the exhaust gas.

The casing 16 contains an oxidation catalyst 19 that is located ahead or on the upper-stream side of the DPF 18. The oxidation catalyst 19 enables continuous regeneration of the DPF 18. In the continuous regeneration, the PMs caught by the DPF 18 is oxidized (or burned) under given conditions with $O_2$ in the exhaust gas and $NO_2$ that is generated as NO in the exhaust gas is oxidized on the oxidation catalyst 19.

A filter temperature related value detecting sensor or element and a temperature sensor 20 are arranged between the oxidation catalyst 19 and the DPF 18. The related value detecting element detects a parameter related to the temperature of the DPF 18. The temperature sensor 20 detects the temperature of the exhaust gas directly on the upper-stream side of the DPF 18.

An ECU (electric control unit) 22 that serves as a control element is composed of a microcomputer, for example. The ECU 22 is connected electrically with the injectors 3a to 3d, waste gate valve 12b, intake throttle valve 12, EGR valve 13b, temperature sensor 20, etc. The ECU 22 is stored with control programs for controlling the injectors 3a to 3d, waste gate valve 12b, intake throttle valve 12, and EGR valve 13b according to the driving conditions of the vehicle when the vehicle is driven normally.

Further, the ECU 22 is stored with a compulsive regeneration control program for compulsively burning (or oxidizing) the PMs that are deposited on the DPF 18 without succeeding in the continuous regeneration during the normal drive. The control based on this program serves as compulsive regeneration control element.

A compulsive regeneration interval and a compulsive regeneration drive mode are used in the compulsive regeneration control program. The compulsive regeneration interval is the time (interval) for the execution of the compulsive regeneration drive, which is equivalent to the interval of the present invention. In the compulsive regeneration drive mode, the temperature of the DPF 18 is raised by means of the oxidation catalyst 19 so that the PMs are burned when the compulsive regeneration interval terminates.

It is hard accurately to detect the quantity of the PMs deposited on the DPF 18. In the conventional compulsive regeneration, therefore, a given cumulative time for the running time of the vehicle, e.g., ten hours, is set as the compulsive regeneration interval. The quantity of the PMs deposited during this interval is estimated.

In the conventional compulsive regeneration, the temperature of the DPF 18 is raised by means of the oxidation catalyst 19 for a necessary time to burn (with $O_2$) the PMs of the estimated quantity when the aforesaid interval terminates. Conventionally, however, this interval is set without taking into consideration the continuous regeneration that is accomplished when some requirements are fulfilled during normal run of the vehicle.

The continuous regeneration is the aforesaid combustion with $NO_2$, which is caused at a low temperature of 250° C. or more and is slower than the combustion with $O_2$.

In the exhaust emission control device 30 of this embodiment, therefore, the compulsive regeneration interval is set in consideration of the circumstances in which a state for the continuous regeneration is realized in the DPF 18. In other words, a method is used such that the compulsive regeneration interval is adjusted in accordance with the history of the circumstances for the realization of the continuous regeneration state of the DPF 18.

During the normal running of the vehicle, therefore, the ECU 22 accumulates the circumstances in which a value equivalent to the continuous regeneration temperature of the DPF 18 is exceeded, in accordance with the exhaust gas temperature (value related to the temperature of the DPF 18) directly on the upper-stream side of the DPF 18 that is detected by means of the temperature sensor 20. Based on the history of the accumulation, the ECU 22 controls and adjusts the compulsive regeneration interval.

More specifically, the ECU 22 adjusts the compulsive regeneration interval in the following manner, for example, in order to execute the aforesaid control.

If the exhaust gas temperature is kept at a temperature (e.g., 300° C. or more) for the continuous regeneration of the DPF 18 for a given time during the normal run of the vehicle, for example, the times during which the temperature is kept within that range are added up. Based on the resulting cumulative value, the value of the compulsive regeneration interval is made longer than an initial set value. The ECU 22 is given the following equations (1) and (2), for example.

Let it be supposed that the continuous regeneration history coefficient, constant, continuous regeneration counter value, and compulsive regeneration interval are K, C, V and S, respectively. The constant C is a value that is set in consideration of variable elements. The continuous regeneration counter value V is a cumulative value that is obtained when the exhaust gas temperature is kept at 300° C. or more for a given time. The initial set value is ten hours, for example.

$$K = C \times V \tag{1}$$

$$S = \text{Initial set value} \times K \tag{2}$$

By carrying out arithmetic operations based on the equations (1) and (2), the compulsive regeneration interval S is corrected so that it is lengthened with the increase of the cumulative value.

On the other hand, the regeneration time for a continuous regeneration drive mode is fixed. In the continuous regeneration drive mode, a first stage for compulsively heating the oxidation catalyst 19 to an activation temperature (e.g., 250° C. or more) is started when the adjusted compulsive regeneration interval S terminates. In this first stage, several modes are executed such that the waste gate valve 12b is opened compulsively, the EGR valve 13b is opened, the intake throttle valve 12 is closed, the injection timing of the injectors 3a to 3d is retarded, the injection pressure of the injectors 3a to 3d is lowered, etc.

If it is concluded from the temperature detected by means of the temperature sensor 20 that the activation temperature is reached by the oxidation catalyst 19, a second stage is started such that the DPF 18 is heated to a combustion temperature of the PMs. The combustion temperature of the PMs is a value equivalent to the compulsive regeneration temperature, which is 550° C. or more, for example. In the second stage, a mode is executed such that unburned fuel is added to the exhaust gas by means of injectors 3a to 3d, for example.

The exhaust gas temperature that is detected by means of the temperature sensor 20 is used not only to adjust the compulsive regeneration interval and control the compulsive regeneration drive, but also to watch the DPF 18 lest it be overheated.

Figure 3B:
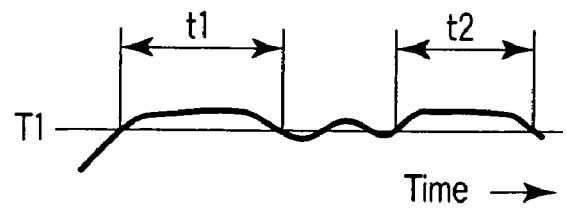
FIG. 3B is a diagram showing an example of change of exhaust gas temperature during continuous regeneration.

The flowcharts of FIGS. 2 and 3A show an example of the compulsive regeneration control in detail.

Let it now be supposed that the vehicle, e.g., a bas, is running in a manner such that the exhaust gas discharged from the diesel engine 1 is discharged to the atmosphere through the exhaust manifold 10, exhaust pipe 11, oxidation catalyst 19, and DPF 18.

If the temperature of the exhaust gas directly on the upper-stream side of the DPF 18 is lower than the temperature value for the combustion of the PMs with $NO_2$ in this normal running, the PMs in the exhaust gas are only caught by the DPF 18 and never burn.

If the temperature of the exhaust gas directly on the upper-stream side of the DPF 18 is not lower than the temperature value for the combustion of the PMs with $NO_2$, NO in the exhaust gas is oxidized on the oxidation catalyst 19. The resulting $NO_2$ and $O_2$ in the exhaust gas subject the PMs deposited on the DPF 18 to combustion (oxidation). During the normal running of the vehicle, therefore, the continuous regeneration is carried out in a manner such that the PMs are caught by the DPF 18 as the caught PMs are burned with $NO_2$ under appropriate conditions (Step S1 in FIG. 2).

The normal drive is continued until the compulsive regeneration interval terminates. The ECU 22 adjusts the compulsive regeneration interval using the equations (1) and (2) until the compulsive regeneration interval terminates. FIG. 3A shows detailed control for this adjustment.

When the normal run of the vehicle is started, the ECU 22 determines whether or not a given temperature value T1 is exceeded by the exhaust gas temperature directly on the upper-stream side of the DPF 18 that is detected by means of the temperature sensor 20. The temperature value T1 is a value related to the temperature for the continuous regeneration of the DPF 18, and is adjusted to 300° C. (temperature related value), for example.

More specifically, only those temperature regions in which the temperature is kept at 300° C. or more for the given time are detected (Step S11 in FIG. 3A) in order to detect securely the continuous regeneration temperature related value for the DPF 18. Then, the elapsed times for these temperature regions are added by means of a continuous regeneration counter. The $NO_2$-combustion for the continuous regeneration is lower in temperature and slower than the $O_2$-combustion. Therefore, the continuous regeneration counter adds only those times during which the continuous regeneration temperature related value $T_1$ for secure combustion of the PMs continues to be exceeded by the exhaust gas temperature detected by means of the temperature sensor 20, as indicated by t1 and t2 in FIG. 3B.

Thus, the continuous regeneration counter adds only those times during which the DPF 18 is securely in the continuous regeneration state (Step S12 in FIG. 3A). The times during which the continuous regeneration state is realized are accumulated so that the initial set value (e.g., ten hours) of the compulsive regeneration interval is reached.

If this initial set value is reached, the ECU 22 adjusts the compulsive regeneration interval S in accordance with the continuous regeneration counter values having so far been accumulated and the arithmetic operations based on the equations (1) and (2). More specifically, the compulsive regeneration interval S is adjusted so that it is lengthened with the increase of the cumulative value. The resulting interval is set as a new compulsive regeneration interval S in the ECU 22 (Step S13 in FIG. 3A). Thus, the normal run of the diesel engine 1 is prolonged until the set compulsive regeneration interval S adjusted in this manner terminates.

When the adjusted compulsive regeneration interval S terminates as the normal run is continued, the compulsive regeneration dive to oxidize (burn) the PMs compulsively with $O_2$ is started in response to a command from the ECU 22 (Steps S2 and S3 in FIG. 2).

For example, the mode in which the temperature of the oxidation catalyst 19 is raised, that is, the first stage, is executed. In the first stage, as mentioned before, the waste gate valve 12b is opened compulsively, the EGR valve 13b is opened, the intake throttle valve 12 is closed, the injection timing of the injectors 3a to 3d is retarded, and the injection pressure of the injectors 3a to 3d is lowered, for example.

If the ECU 22 then concludes from the temperature value from the temperature sensor 20 that the exhaust gas temperature is raised to the activation temperature of the oxidation catalyst 19, the stage is changed over to the second stage for raising the temperature of the DPF 18, and the second stage is executed. In the second stage, the unburned fuel is added to the exhaust gas by post injection by means of injectors 3a to 3d, for example. When the preset compulsive regeneration time terminates, the ECU 22 concludes that a target value is reached by the quantity of PM combustion of the DPF 18 and terminates the compulsive regeneration drive, whereupon the drive mode returns to the normal drive (Step S4 in FIG. 2).

In the exhaust emission control device 30 of the present embodiment, as described above, the compulsive regeneration interval is adjusted in accordance with the accumulation history of the exhaust gas temperature (accumulation of the circumstances in which the value equivalent to the continuous regeneration temperature is exceeded). Thus, the circumstances in which the continuous regeneration state of low-temperature, slow combustion with $NO_2$ is realized are reflected in the compulsive regeneration interval, and this interval is adjusted properly.

Accordingly, the quantity of the deposited PMs at the start of the compulsive regeneration is substantially fixed, and the compulsive regeneration can be carried out for the properly adjusted compulsive regeneration time. More specifically, the compulsive regeneration can be securely performed without entailing useless compulsive regeneration or retardation of the compulsive regeneration. In order to adjust the compulsive regeneration interval, according to the present embodiment, in particular, the cumulative value is obtained when a temperature not lower than the temperature value for the continuous regeneration is continuously maintained for the given time, and the interval is lengthened with the increase of the cumulative value. Thus, a more appropriate compulsive regeneration interval can be secured.

Further, the exhaust gas temperature directly on the upper-stream side of the DPF 18 that can be expected be highly accurate is used as the parameter related to the temperature of the DPF 18. Therefore, accomplishment of the continuous regeneration can be accurately recognized to ensure appropriate adjustment of the compulsive regeneration interval. Besides, the exhaust gas temperature that is detected by means of the temperature sensor 20 is used for compulsive regeneration drive control (regeneration control based on the exhaust gas temperature) during the execution of the compulsive regeneration control, as well as for adjustment of the compulsive regeneration interval. Thus, the control programs and the like are shared by the adjustment of the compulsive regeneration interval and the compulsive regeneration control, so that control operations can be simplified in both the control systems.

It is to be understood that the present invention is not limited to the one embodiment described above, and that various changes and modifications may be effected therein without departing from the scope or spirit of the invention.

What is claimed is:

1. An exhaust emission control device of an engine, comprising:

a diesel particulate filter which is set in an exhaust passage of the engine and catches particulate matters in exhaust gas;

an oxidation catalyst set in the exhaust passage so as to be situated on the upper-stream side of the diesel particulate filter; and compulsive regeneration control element which compulsively raises the temperature of the diesel particulate filter in a given interval, the device further comprising filter temperature related value detecting element which detects a parameter related to the temperature of the diesel particulate filter, the compulsive regeneration control element being configured to adjust the interval in accordance with an accumulation history of circumstances in which a value equivalent to a continuous regeneration temperature is exceeded by the parameter related to the temperature of the diesel particulate filter.

2. An exhaust emission control device of an engine according to claim 1, wherein the compulsive regeneration control element adds up cases in which the parameter related to the temperature of the diesel particulate filter continues to be not lower than a given temperature for a given time, and the interval is lengthened with the increase of the resulting cumulative value.

3. An exhaust emission control device of an engine according to claim 1, wherein the filter temperature related value detecting element detects the temperature of the exhaust gas directly on the upper-stream side of the diesel particulate filter, and the compulsive regeneration control element adjusts the interval in accordance with the exhaust gas temperature and executes the compulsive regeneration control in accordance with the exhaust gas temperature.

4. An exhaust emission control method for an engine, which comprises a diesel particulate filter which is set in an exhaust passage of the engine and catches particulate matters in exhaust gas, an oxidation catalyst set in the exhaust passage so as to be situated on the upper-stream side of the diesel particulate filter, and compulsive regeneration control element which compulsively raises the temperature of the diesel particulate filter in a given interval, the method comprising:

a step of detecting a parameter related to the temperature of the diesel particulate filter, the compulsive regeneration control element having a step of adjusting the interval in accordance with an accumulation history of circumstances in which a value equivalent to a continuous regeneration temperature is exceeded by the parameter related to the temperature of the diesel particulate filter, detected in said step.

5. An exhaust emission control method for an engine according to claim 4, wherein the compulsive regeneration control element has a step of adding up cases in which the parameter related to the temperature of the diesel particulate filter, detected in the step of detecting the parameter, continues to be not lower than a given temperature for a given time, and a step of lengthening the interval with the increase of the resulting cumulative value.

6. An exhaust emission control method for an engine according to claim 4, wherein the step of detecting the parameter related to the temperature of the diesel particulate filter includes detecting the temperature of the exhaust gas directly on the upper-stream side of the diesel particulate filter, and the compulsive regeneration control element adjusts the interval in accordance with the exhaust gas temperature and executes the compulsive regeneration control in accordance with the exhaust gas temperature.

* * * * *